P. J. RYAN.
ANCHOR.
APPLICATION FILED JAN. 21, 1921.

1,392,526.

Patented Oct. 4, 1921.

INVENTOR
Patrick J. Ryan
BY
Redding & Greeley
ATTORNEYS

UNITED STATES PATENT OFFICE.

PATRICK J. RYAN, OF NEW YORK, N. Y.

ANCHOR.

1,392,526.

Specification of Letters Patent. Patented Oct. 4, 1921.

Application filed January 21, 1921. Serial No. 438,855.

*To all whom it may concern:*

Be it known that I, PATRICK J. RYAN, a citizen of the United States, residing in the city of New York, in the State of New York, have invented certain new and useful Improvements in Anchors, of which the following is a specification, reference being had to the accompanying drawings, forming a part hereof.

This invention relates to stockless anchors in which the head (including the flukes and the crown) is arranged to swing on the shank so that the flukes may lie in the same plane with the shank when the anchor is stowed and shall swing in either direction from such plane in order that they may engage the bottom when the anchor is in use. For greater convenience in shipping and storing stockless anchors, especially of the non-swinging or non-folding variety, it is usual to make the shank detachable from the head and various means have been devised and are in use to some extent for securing the shank to the head when the anchor is assembled and in readiness for use, such means commonly comprising a cross-pin or a key or a nut and so preventing the swinging of the head on an axis at right angles to the shank. It is the object of this invention to provide means whereby the shank and head can be detachably secured together without interference with the desired swinging movement of the head and without danger of accidental separation. In accordance with the invention the anchor-head is formed with a socket and the shank with a co-acting head which fits loosely within the socket and is provided with means to prevent accidental disengagement. The invention will be more fully explained hereinafter with reference to the accompanying drawing in which it is illustrated and in which—

Figure 1:
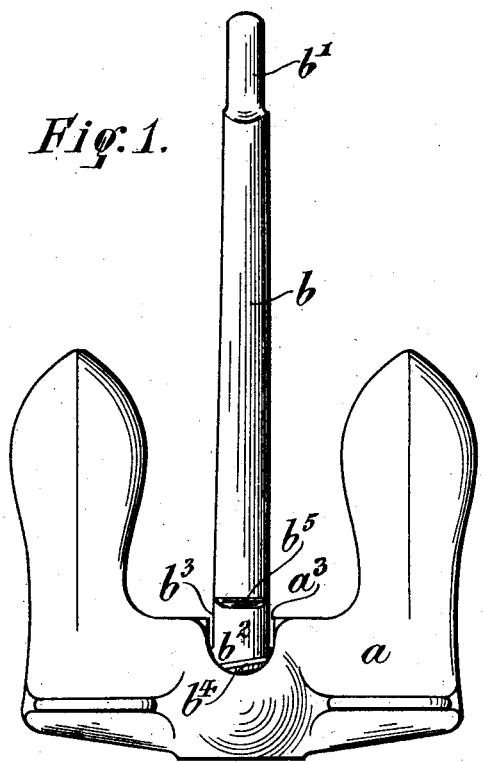
Figure 1 is a view in side elevation of an anchor which embodies the invention.
Figure 2:
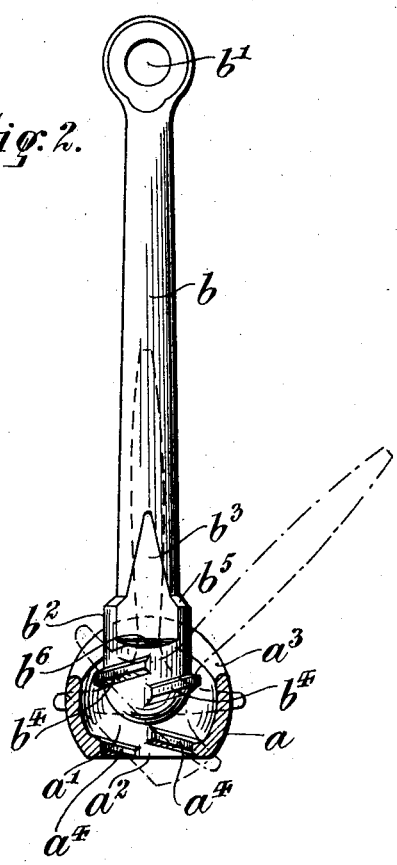
Fig. 2 is a view of the same with the shank in elevation and the anchor-head in transverse section.
Figure 3:
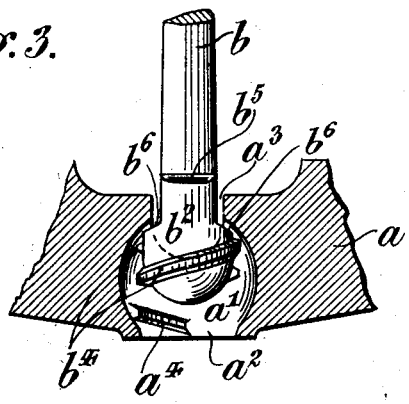
Fig. 3 is a detail view showing a portion of the shank in elevation and a portion of the anchor-head in section on a plane at right agles to that of Fig. 2.

The head $a$ may have any usual or desired form except that it is provided centrally with a socket $a'$, which may be substantially spherical, and is provided at the lower side of the head with a substantially circular opening $a^2$ and at the upper side of the head with a transverse, elongated opening $a^3$, the width of which is less than the diameter of the opening $a^2$. Interiorly the socket is provided with interrupted screw threads $a^4$, near the opening $a^2$. The shank $b$ may also be of any usual or preferred form except as hereinafter indicated, having at its upper end an eye $b'$ for engagement with a shackle. At its lower end the shank $b$ is formed with an enlarged head $b^2$, which is of such size that it can pass through the opening $a^2$ of the socket but not through the opening $a^3$. It is preferably rounded as shown and is flattened on opposite sides of its upper part, as at $b^3$, to permit such upper part to move freely in the transverse opening $a^3$. The head $b^2$ is also provided with mutilated screw threads $b^4$ adapted to co-act with the mutilated screw threads $a^4$ of the socket, the screw threads $b^4$ being formed far enough above the lower end of the head $b^2$ to permit the head to be rotated through a half turn after the head has been drawn within the socket, through the opening $a^2$ and before the upper portion of the head, flattened at $b^3$, has passed into the opening $a^3$. It will be noted that the shoulder $b^5$, which defines the upper end of the head $b^2$, is at such a distance from the lower end of the shank that a substantial portion of the head may pass through the opening $a^3$, and that the shoulders $b^6$, which define the lower ends of the flattened portions $b^3$, also limit the upward movement of the shank with respect to the anchor-head by engagement with the upper wall of the socket.

In assembling the shank and head of the improved anchor, the shank is introduced into the socket from below and moved upward until the threads $b^4$ on the head $b^2$ strike the threads $a^4$ of the socket $a'$, then the shank receives a partial rotation which causes the threads $b^4$ to pass through and clear the threads $a^4$, such clearance being effected before the upper portion of the head, below the shoulder $b^5$, has passed into the transverse opening in the upper side of the anchor-head. As soon as the threads of the head have cleared the threads of the socket, the shank is drawn farther up with respect to the anchor-head so that the flattened portion of the head shall stand in the relatively narrow transverse opening $a^3$ and the relative rotation of the shank and anchor-head be thereby prevented. In use, the weight of the head or the strain on the head causes the shank and head to retain the relation which prevents relative rotation, so that relative rotation of the shank and head, necessary to disengage the two, is not permitted. At the same time, the head is permitted to swing freely with respect to the shank, as is necessary in use and is desirable when the anchor is taken inboard and stowed. When the anchor is laid upon the deck or floor the shank can be detached readily from the head by reversing the relative movement already described. It will be noted that the improved anchor consists of two parts only, that the parts can be assembled easily, and that no machining of the parts is necessary.

It will be obvious that various changes in details of construction and arrangement of the interengaging devices and other parts can be made to suit the convenience of the manufacturer and the demands of the trade or the conditions of use and that the invention, except as pointed out in the claims, is not limited to the precise construction and arrangement shown and described herein.

I claim as my invention:

1. A stockless anchor, comprising an anchor-head and a detachable shank, the anchor-head having a central socket and the shank having a head to enter the socket freely, the head and the socket respectively having interengaging devices formed thereon to prevent accidental separation of the shank and anchor-head and to permit the ready separation thereof when desired.

2. A stockless anchor, comprising an anchor-head and a detachable shank, the anchor-head having a central socket with interrupted screw threads and the shank having a shouldered head with interrupted screw threads to co-act with the screw threads of the socket.

3. A stockless anchor comprising an anchor-head and a detachable shank, the anchor-head having a central socket with a transverse and relatively narrow opening in its upper side and an opening of greater diameter in its lower side, and the shank having an enlarged head capable of passing through the lower opening of the socket and incapable of passing through the upper opening, the head and the socket being formed respectively with devices to prevent the head from passing freely through the lower opening from within the socket and to permit the ready separation of the shank from the anchor-head when desired.

4. A stockless anchor comprising an anchor-head and a detachable shank, the anchor-head having a central socket with a transverse and relatively narrow opening in its upper side and an opening of greater diameter in its lower side, and the shank having an enlarged head capable of passing through the lower opening of the socket and incapable of passing through the upper opening, the head and the socket being provided with loosely coöperating screw threads and interengaging devices to prevent relative rotation when the head is seated in the socket.

This specification signed this 13th day of January, A. D. 1921.

PATRICK J. RYAN.